United States Patent [19]

de Montigny et al.

[11] 4,281,144

[45] Jul. 28, 1981

[54] PREPARATION OF MULTI-BRANCHED SILICON-FUNCTIONAL POLYORGANO-SILOXANES

[75] Inventors: Armand de Montigny, Leverkusen; Hans-Heinrich Moretto, Cologne, both of Fed. Rep. of Germany

[73] Assignee: Bayer Aktiengesellschaft, Leverkusen, Fed. Rep. of Germany

[21] Appl. No.: 144,101

[22] Filed: Apr. 28, 1980

[30] Foreign Application Priority Data

May 15, 1979 [DE] Fed. Rep. of Germany ....... 2919559

[51] Int. Cl.³ .......................... C07F 7/10; C07F 7/18
[52] U.S. Cl. ..................... 556/416; 556/442
[58] Field of Search ......................... 556/442, 416

[56] References Cited

U.S. PATENT DOCUMENTS

| | | | |
|---|---|---|---|
| 2,381,366 | 8/1945 | Patnode | 260/607 |
| 2,421,653 | 6/1947 | Sauer | 260/607 |
| 3,162,662 | 12/1964 | Brown et al. | 260/448.2 |
| 3,183,254 | 5/1965 | Rossmy et al. | 556/442 X |
| 3,346,610 | 10/1967 | Omietanski et al. | 556/442 |
| 3,595,885 | 7/1971 | Rossmy et al. | 556/442 X |
| 4,044,038 | 8/1977 | Rossmy | 260/448.2 |
| 4,073,801 | 2/1978 | Moretto et al. | 260/448.2 |
| 4,176,130 | 11/1979 | John et al. | 556/442 |
| 4,177,201 | 12/1979 | de Montigny et al. | 556/442 X |

FOREIGN PATENT DOCUMENTS

| | | |
|---|---|---|
| 1174509 | 7/1964 | Fed. Rep. of Germany . |
| 2345923 | 3/1975 | Fed. Rep. of Germany . |
| 2353166 | 4/1975 | Fed. Rep. of Germany . |
| 2453482 | 5/1976 | Fed. Rep. of Germany . |
| 899148 | 6/1962 | United Kingdom . |
| 931939 | 7/1963 | United Kingdom . |
| 1431367 | 4/1976 | United Kingdom . |
| 1476834 | 6/1977 | United Kingdom . |

*Primary Examiner*—Paul F. Shaver
*Attorney, Agent, or Firm*—Sprung, Felfe, Horn, Lynch & Kramer

[57] ABSTRACT

In the preparation of multi-branched equilibrated mixed acyloxy-containing and chlorine-containing organo polysiloxanes by reacting a chlorosilane of the formula $$R_a SiCl_{4-a}$$

wherein $a = 0$ or 1, with at least one organosiloxane containing units of the formula $$R_2R'SiO_{1/2}, RR'SiO, R'SiO_{3/2} \text{ and/or } SiO_2$$

wherein
R is hydrogen or an aliphatic, aromatic, saturated or unsaturated, optionally halogen-substituted or cyano-substituted monovalent hydrocarbon radical with up to 8 C atoms and
R' is chlorine, hydroxyl, hydrogen or an aliphatic, aromatic, saturated or unsaturated, optionally halogen-substituted or cyano-substituted monovalent hydrocarbon radical with up to 8 C atoms, in proportions such that the number of all the SiCl groups is always at least 1.5 times greater than the number of SiOH groups, in the presence of (a) fluoroalkanesulphonic acid or salt thereof and (b) relative to the chlorine atoms bonded to silicon, at least 1.1 times the molar amount of a concentrated monobasic carboxylic acid, the improvement which comprises adding a portion of the carboxylic acid in a first stage, and in a second stage adding the balance of the carboxylic acid along with water in the amount required to achieve the desired degree of branching. Advantageously the fluoroalkanesulphonic acid is a perfluoroalkanesulphonic acid containing up to 8 carbon atoms, and it or its salt is employed in about 0.05 to 1.5% by weight of chlorosilane plus organosilane, the carboxylic acid is acetic acid, the reaction is carried out at a temperature up to about 135° C., the organosilane comprises a cyclosiloxane of the formula $$(RR'=SiO)_{3-5},$$

and about half the acetic acid is added in each stage.

7 Claims, No Drawings

PREPARATION OF MULTI-BRANCHED SILICON-FUNCTIONAL POLYORGANO-SILOXANES

The present invention relates to a process for the preparation of multi-branched silicon-functional polyorganosiloxanes by a so-called equilibration, part of which takes place in the presence of calculated amounts of water, fluoroalkanesulphonic acids or salts thereof in combination with excess monobasic carboxylic acids, such as, for example, acetic acid or propionic acid, being used as the catalysts.

Branched silicon-functional polyorganosiloxanes, such as, for example, siloxanes with terminal chlorine atoms or acetoxy radicals bonded to Si, are starting substances for a large number of materials containing an organopolysiloxane since they are suitable for reaction with reactive hydrogen atoms, such as are present, for example, in alcohols, amines and many other compounds. They are thus used, inter alia, for the preparation of polyether/polysiloxane copolymers, which, because of their surface-active properties, are used widely in industry, for example as stabilizers for the production of polyurethane foam, and for the preparation of other block copolymers. Attempts to prepare silicon-functional polyorganosiloxanes have hitherto concentrated, above all, on the preparation of chlorine-containing organopolysiloxanes either by incomplete hydrolysis of organochlorosilanes (compare, for example, U.S. Pat. No. 2,381,366, DE-AS (German Published Specification) No. 1,174,509 and DE-OS (German Published Specification) No. 2,345,923) or by reaction of chlorosilanes with, above all, cyclic siloxanes in the presence of catalysts, such as, for example, $FeCl_3$ and/or HCl (U.S. Pat. No. 2,421,653) or phosphine oxides (U.S. Pat. No. 3,162,662). Quaternary ammonium salts are also used to open the ring in cyclotrisiloxanes in the presence of chlorosilanes in order to obtain chlorosiloxanes (U.S. Pat. No. 3,162,662). Catalyst mixtures, such as hydrogen halide/proton acid equilibration catalyst (DE-OS (German Published Specification) No. 2,453,482) or hydrogen halides/peralkylated acid amide (DE-OS (German Published Specification) No. 2,353,166) have recently been described in connection with the reaction of organochlorosiloxanes and polyorganosiloxanes.

The present invention relates to a process for the preparation of multi-branched equilibrated mixed acyloxy-containing and chlorine-containing organopolysiloxanes by reacting a chlorosilane of the formula

wherein
a=0 or 1,
at temperatures of not more than about 135° C., with one or more organosiloxanes which can contain the following units, in optionally varying sequence

wherein
R is hydrogen or an aliphatic, aromatic, saturated or unsaturated, optionally halogenated cyano-substituted monovalent hydrocarbon radical with up to 8 C atoms and
R' is chlorine, hydroxyl or R,
in proportions such that the number of chlorine atoms bonded to silicon is always at least 1.5 times, preferably 3 times, greater than the number of SiOH groups, in the presence of a combination of an alkanefluorosulphonic acid or salts thereof and—relative to the chlorine atoms bonded to silicon—at least about 1.1 times, preferably twice, the molar amount of concentrated monobasic carboxylic acid, in particular acetic acid, which is characterized in that the carboxylic acid is added in two stages, water also being added in the second stage in an amount calculated to achieve the desired multiple branching.

Compared with the state of the art as well as with single stage addition of acetic acid as shown in application Ser. No. 974,412, filed Dec. 29, 1978, now U.S. Pat. No. 4,177,201 now pending, the process according to the invention provides considerable advantages. Expenditure on apparatus is restricted to a minimum, that is to say neither expensive cooling system nor expensive metering units for water nor pressure units are required. A customary water-cooled cooling system is entirely sufficient. Metering of the water is not critical. The reaction time (determined by the addition of water in the case of the hydrolysis process) is only a fraction of the time of the abovementioned processes. Increased pressure to achieve complete reaction can be dispensed with. The ability to dispense with increased pressure is also not achieved at the expense of longer reaction times. The hydrogen chloride obtained is a minimum. Its release can be controlled, so that neither pollution of the environment nor interference in stoichiometry by entrainment of reactants need be feared.

A preferred embodiment of the process is characterized in that about twice the molar amount—relative to the chlorine atoms bonded to silicon—of carboxylic acid is present.

The possible equilibration catalysts are fluoroalkanesulphonic acids, and preferably perfluoroalkanesulphonic acids such as, for example, $CF_3SO_3H$, $C_2F_5SO_3H$, $C_4F_9SO_3H$, $C_8F_{17}SO_3H$ and $C_4F_8HSO_3H$, and salts thereof, the potassium compounds being preferred to the sodium compounds, calcium compounds and other metal compounds. The amount of catalysts employed is about 0.05 to 1.5% by weight, and, in the case of the acids, 0.2 to 0.7% by weight is preferably employed.

Examples of possible silanes are methyltrichlorosilane, chloromethyltrichlorosilane, vinyltrichlorosilane, phenyltrichlorosilane and silicon tetrachloride.

Suitable siloxanes are preferably the direct hydrolysis products of dimethyldichlorosilane, such as are obtained on a large industrial scale as a precursor for the production of cyclosiloxanes, and the cyclosiloxanes:

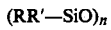

in which
n=3 to 5,
and wherein
R and R' have the meaning already given. Possible siloxanes are, above all, also any desired linear and branched siloxanes, the preparation of which is familiar to the expert. These siloxanes can contain silicon-functional groups, such as Si—OH or SiCl groups, or also lateral organofunctional groups, such as Si-vinyl, —Si—$CH_2Cl$ and the like.

The process according to the invention is in general carried out by a procedure in which the chlorosilane is mixed with the siloxane, the catalyst is added and the mixture is warmed slowly, while stirring. After about 20 minutes, the temperature has reached 60° C. The viscosity of the contents of the flask has increased greatly. About 5% of the carboxylic acid, preferably acetic acid, is now added, whereupon the viscosity is reduced again. After the temperature has reached 90° C., about half the envisaged amounts of acetic acid - preferably the stoichiometric amount, relative to the chlorine atoms bonded to silicon - is added in the course of about 45 minutes and the mixture is heated to about 130°–135° C.

The remainder of the carboxylic acid, to which the calculated amount of water has been added, is then added at this temperature, in the course of about an hour. The two-stage addition of the carboxylic acid can, of course, also be carried out with unequal portions, for example 10/90, 30/70 or also 90/10. However, it is preferably to add portions approximately equal in size.

The mixture is then boiled under reflux for about 1–2 hours. After cooling, the carboxylic acid which remains is distilled off under a water pump vacuum. A transparent highly hygroscopic liquid which is slightly yellow to brownish in color, depending on the quality of the materials employed, remains.

The equilibration reaction ceases immediately after removal of the carboxylic acid (distillation in vacuo). Thermal devolatilization to remove low-molecular constituents, such as, for example, octamethylcyclotetrasiloxane, thus becomes problem-free.

Because of the favorable reaction conditions and the short reaction times, it is possible to carry out the preparation continuously without problems. Examples of the monobasic carboxylic acid which can be employed are acetic acid, propionic acid or also higher carboxylic acids. However, acetic acid is preferred.

The present invention is illustrated in more detail by the following examples (% data relate to % by weight, unless otherwise indicated). The functional end groups are given in the form of equivalents of $H^+$ per 100 g.

EXAMPLE 1–2

777 g [2.625 mols] of octamethylcyclotetrasiloxane are mixed with 75 g [0.5 mol] of methyltrichlorosilane. 2.25 g [0.26%] of perfluorobutanesulphonic acid are added to this mixture. The mixture is then heated up slowly. After about 20 minutes, the temperature has risen to 60° C. and the contents of the flask have become highly viscous. 15 g [0.25 mol] of pure acetic acid are now added dropwise, whereupon the viscosity of the siloxane rapidly decreases. After 10 minutes, 85 g (1.42 mols] of acetic acid are added dropwise at 90° C. in the course of 45 minutes. After the addition of the acetic acid, the mixture is heated up to the reflux temperature (about 135° C.) in the course of 30–60 minutes. A mixture of 100 g [1.67 mols] of acetic acid and 5 g [0.28 mol] of water is added at this temperature in the course of 60 minutes. After stirring the mixture for 30–60 minutes, it is cooled and subjected to thermal devolatilization at 120° C. (bottom temperature) and under 18 mbar.

The residue is a clear slightly yellowish liquid.

| Results: Example | 1 | 2 |
|---|---|---|
| Yield [g] | 838 | 838 |
| Thermal devolatilization distillate [g] | 149 | 149 |
| mequivalent of $H^+$/100 g | 98.6 | 98.0 |

EXAMPLE 3–4

Examples 1–2 were repeated, with the exception that 6 g [0.33 mol] of water were added instead of 5 g [0.28 mol]. In Example 4, the entire batch was doubled. The external conditions (time, temperature, pressure) were unchanged.

| Results: Example: | 3 | 4 |
|---|---|---|
| Yield [g] | 833 | 1575 |
| Thermal devolatilization distillate [g] | 169 | 395 |
| mequivalent of $H^+$/100 g | 85.8 | 90 |

EXAMPLE 5

1,776 g [6.00 mols] of octamethylcyclotetrasiloxane and 150 g [1 mol] of methyltrichlorosilane are reacted with 9 g [0.5 mol] of water in the presence of 5.7 g [0.3%] of perfluorobutanesulphonic acid and 360 g of acetic acid by the method described in Example 1–2. Thermal devolatilization temperature: 120° C. under 18 mbar. The residue is a slightly yellowish-colored liquid.

| Results: | |
|---|---|
| Yield [g] | 1778 |
| Thermal devolatilization distillate [g] | 326 |
| mequivalent of $H^+$/100 g | 96.2 |

EXAMPLE 6

Example 5 was repeated, but the amount of acetic acid was increased to 480 g and the amount of water was increased to 15.3 g [0.85 mol]. The other conditions remained unchanged.

| Results: | |
|---|---|
| Yield [g] | 1843 |
| Thermal devolatilization distillate [g] | 479 |
| mequivalent of $H^+$/100 g | 65 |

EXAMPLE 7

299 g [2.00 mols] of methyltrichlorosilane and 2,220 g [7.5 mols] of octamethylcyclotetrasilane in 800 g of technical grade acetic acid are reacted with 21 g [1.167 mols] of water in the presence of 6.9 g [0.27%] of perfluorobutanesulphonic acid by the method described in Example 1–2. The thermal devolatilization temperature was 120° C. (bottom temperature) under 18 mbar.

| Results: | |
|---|---|
| Yield [g] | 2472 |
| Thermal devolatilization distillate [g] | 534 |
| mequivalent of $H^+$/100 g | 136.7 |

EXAMPLE 8

1,110 g [3.75 mols] of octamethylcyclotetrasiloxane and 187 g [1.25 mols] of methyltrichlorosilane in 375 g of pure acetic acid are reacted with 11.2 g [0.662 mol] of water in the presence of 4.32 g [0.33%] of perfluorobutanesulphonic acid by the method described in Example 1–2. The external conditions were unchanged except for the thermal devolatilization temperature, which was 135° C. under 7 mbar.

| Results: | |
|---|---|
| Yield [g] | 1179 |
| Thermal devolatilization distillate [g] | 266 |
| mequivalent of H+/100 g | 158 |

It will be appreciated that the instant specification and examples are set forth by way of illustration and not limitation, and that various modifications and changes may be made without departing from the spirit and scope of the present invention.

What is claimed is:

1. In the preparation of multi-branched equilibrated mixed acyloxy-containing and chlorine-containing organopolysiloxanes by reacting a chlorosilane of the formula $$R_a SiCl_{4-a}$$

wherein
a = 0 or 1,
with at least one organosiloxane containing units of the formula $$R_2R'SiO_{1/2}, RR'SiO, R'SiO_{3/2} \text{ and/or } SiO_2$$

wherein
R is hydrogen or an aliphatic, aromatic, saturated or unsaturated, optionally halogen-substituted or cyano-substituted monovalent hydrocarbon radical with up to 8 C atoms and
R' is chlorine, hydroxyl, hydrogen or an aliphatic, aromatic, saturated or unsaturated, optionally halogen-substituted or cyano-substituted monovalent hydrocarbon radical with up to 8 C atoms,
in proportions such that the number of all the SiCl groups is always at least 1.5 times greater than the number of SiOH groups, in the presence of (a) fluoroalkanesulphonic acid or salt thereof and (b) relative to the chlorine atoms bonded to silicon, at least 1.1 times the molar amount of a concentrated monobasic carboxylic acid, the improvement which comprises adding a portion of the carboxylic acid in a first stage, and in a second stage adding the balance of the carboxylic acid along with water in the amount required to achieve the desired degree of branching.

2. A process according to claim 1, wherein the carboxylic acid is acetic acid.

3. A process according to claim 1, wherein the reaction is carried out at a temperature up to about 135° C.

4. A process according to claim 1, in which the fluoroalkanesulphonic acid is a perfluoroalkanesulphonic acid containing up to 8 carbon atoms, and it or its salt is employed in about 0.05 to 1.5% by weight of clorosilane plus organosilane.

5. A process according to claim 1, wherein the organosilane comprises a cyclosiloxane of the formula $$(RR'=SiO)_{3-5}.$$

6. A process according to claim 1, wherein about half the carboxylic acid is added in each stage.

7. A process according to claim 4, wherein the carboxylic acid is acetic acid, the reaction is carried out at a temperature up to about 135° C., the organosilane comprises a cyclosiloxane of the formula $$(RR'=SiO)_{3-5},$$

and about half the acetic acid is added in each stage.

* * * * *